US011005393B2

United States Patent
Wang

(10) Patent No.: US 11,005,393 B2
(45) Date of Patent: May 11, 2021

(54) METHOD FOR CONTROLLING MAGNETIC LEVITATION OBJECT, MAGNETIC LEVITATION SEAT FOR MAGNETIC LEVITATION OBJECT AND MAGNETIC LEVITATION OBJECT

(71) Applicant: BOE TECHNOLOGY GROUP CO., LTD., Beijing (CN)

(72) Inventor: Yongbo Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 404 days.

(21) Appl. No.: 15/927,549

(22) Filed: Mar. 21, 2018

(65) Prior Publication Data
US 2019/0009689 A1   Jan. 10, 2019

(30) Foreign Application Priority Data

Jul. 7, 2017  (CN) .......................... 201710549964.5

(51) Int. Cl.
*H02N 15/00* (2006.01)
*B60L 13/06* (2006.01)
(Continued)

(52) U.S. Cl.
CPC .............. *H02N 15/00* (2013.01); *B60L 13/04* (2013.01); *B60L 13/06* (2013.01); *B60L 13/08* (2013.01); *G05F 7/00* (2013.01)

(58) Field of Classification Search
CPC ........ H02N 15/00; H02N 15/02; B60L 13/04; B60L 13/06; B60L 13/08; B60L 2220/12; B60L 2200/26; G05F 7/00
(Continued)

(56) References Cited

U.S. PATENT DOCUMENTS 5,168,183 A * 12/1992 Whitehead ............ F16C 32/044
                                                    104/284
5,282,424 A *  2/1994 O'Neill ................... B61B 13/10
                                                    104/138.1
(Continued)

FOREIGN PATENT DOCUMENTS

| CN | 102055382 A | 5/2011 |
| CN | 102315804 A | 1/2012 |
| CN | 104270035 A | 1/2015 |

OTHER PUBLICATIONS

Fourth Office Action, including Search Report, for Chinese Patent Application No. 201710549964.5, dated Dec. 2, 2019, 82 pages.
(Continued)

*Primary Examiner* — Zachary L Kuhfuss
(74) *Attorney, Agent, or Firm* — Westman, Champlin & Koehler, P.A.

(57) ABSTRACT

The present disclosure in some embodiments provides a method for controlling a magnetic levitation object, including steps of: receiving, by a magnetic levitation seat, angular offset information from the magnetic levitation object; determining, by the magnetic levitation seat, an offset angle of a center of gravity of the magnetic levitation object relative to a central magnetic point of the magnetic levitation seat in accordance with the angular offset information; and adjusting, by the magnetic levitation seat, a magnetic force from a corresponding region of the magnetic levitation seat in accordance with the offset angle.

9 Claims, 8 Drawing Sheets

(51) Int. Cl.
   *B60L 13/08*   (2006.01)
   *B60L 13/04*   (2006.01)
   *G05F 7/00*   (2006.01)

(58) Field of Classification Search
   USPC .................................................. 104/281, 284
   See application file for complete search history.

(56) References Cited

U.S. PATENT DOCUMENTS

| | | | | |
|---|---|---|---|---|
| 7,224,252 | B2* | 5/2007 | Meadow, Jr. | A63B 21/00192 |
| | | | | 104/281 |
| 7,505,243 | B2* | 3/2009 | Davis | H02N 15/00 |
| | | | | 361/144 |
| 8,237,429 | B2* | 8/2012 | Schmid | B60L 13/06 |
| | | | | 324/207.11 |
| 8,333,156 | B2* | 12/2012 | Schmid | B60L 13/04 |
| | | | | 104/284 |
| 8,358,423 | B2* | 1/2013 | Funken | G01B 11/026 |
| | | | | 356/623 |
| 8,803,646 | B2* | 8/2014 | Farber | H01F 7/00 |
| | | | | 335/306 |
| 9,254,759 | B1* | 2/2016 | Henderson | H02N 15/02 |
| 2009/0315542 | A1* | 12/2009 | Schmid | G01R 33/06 |
| | | | | 324/207.11 |
| 2019/0009689 | A1* | 1/2019 | Wang | B60L 13/08 |

OTHER PUBLICATIONS

Second Office Action, including Search Report, for Chinese Patent Application No. 201710549964.5, dated Nov. 1, 2018, 62 pages.

* cited by examiner

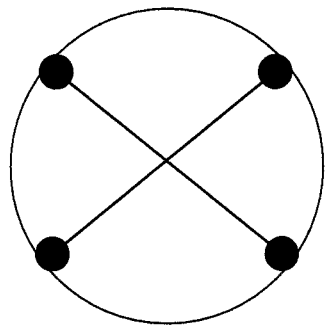

FIG. 8

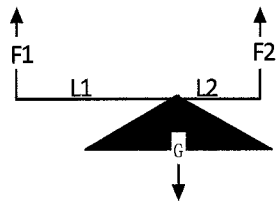

FIG. 9

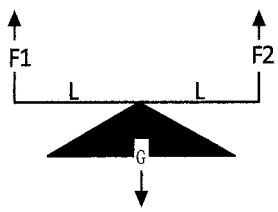

FIG. 10

| detecting, by a magnetic levitation object, an offset angle of a center of gravity of the magnetic levitation object relative to a central magnetic point of a magnetic levitation seat | 1101 |

| transmitting, by the magnetic levitation object, angular offset information to the magnetic levitation seat, so as to enable the magnetic levitation seat to determine the offset angle of the center of gravity of the magnetic levitation object relative to the central magnetic point of the magnetic levitation seat, and enable the magnetic levitation seat to adjust a magnetic force from a corresponding region of the magnetic levitation seat in accordance with the offset angle | 1102 |

FIG. 11

METHOD FOR CONTROLLING MAGNETIC LEVITATION OBJECT, MAGNETIC LEVITATION SEAT FOR MAGNETIC LEVITATION OBJECT AND MAGNETIC LEVITATION OBJECT

CROSS-REFERENCE TO RELATED APPLICATION

The present application claims a priority of the Chinese patent application No. 201710549964.5 filed on Jul. 7, 2017, which is incorporated herein by reference in its entirety.

TECHNICAL FIELD

The present disclosure relates to the field of magnetic levitation technology, in particular to a method for controlling a magnetic levitation object, a magnetic levitation seat for the magnetic levitation object, and the magnetic levitation object.

BACKGROUND

Along with the development of the magnetic levitation technology, currently more and more magnetic levitation products have arisen, e.g., magnetic levitation sound equipment, magnetic levitation toys or magnetic levitation decorations. Each magnetic levitation product may include a magnetic levitation object and a magnetic levitation seat for the magnetic levitation object. Correspondingly, the magnetic levitation object is levitated above the magnetic levitation seat under the effect of a magnetic force. However, in actual use, during the levitation, the magnetic levitation object may be affected by gravity and the magnetic force, so the stability of the magnetic levitation object may be adversely affected.

SUMMARY

In one aspect, the present disclosure provides in some embodiments a method for controlling a magnetic levitation member, including steps of: acquiring, by the magnetic levitation member, an offset angle of a center of gravity of another magnetic levitation member relative to a central magnetic point of the magnetic levitation member; and adjusting, by the magnetic levitation member, a magnetic force from a corresponding region of the magnetic levitation member in accordance with the offset angle.

In a possible embodiment of the present disclosure, in the case that the magnetic levitation member is a magnetic levitation seat and the other magnetic levitation member is a magnetic levitation object, the method includes: receiving, by the magnetic levitation seat, angular offset information from the magnetic levitation object; determining, by the magnetic levitation seat, an offset angle of a center of gravity of the magnetic levitation object relative to a central magnetic point of the magnetic levitation seat; and adjusting, by the magnetic levitation seat, a magnetic force from a corresponding region of the magnetic levitation seat in accordance with the offset angle.

In a possible embodiment of the present disclosure, the magnetic levitation seat is provided with N pairs of magnetic force adjustment regions, and the two magnetic force adjustment regions in each pair are arranged symmetric to each other about the central magnetic point, where N is an integer greater than or equal to 1. The step of adjusting, by the magnetic levitation seat, the magnetic force from the corresponding region of the magnetic levitation seat in accordance with the offset angle includes: selecting, by the magnetic levitation seat, at least one magnetic force adjustment region corresponding to the offset angle from the N pairs of magnetic force adjustment regions in accordance with a first correspondence between the offset angles and the magnetic force adjustment regions acquired in advance, and adjusting the magnetic force from the at least one magnetic force adjustment region.

In a possible embodiment of the present disclosure, the step of selecting, by the magnetic levitation seat, the at least one magnetic force adjustment region corresponding to the offset angle from the N pairs of magnetic force adjustment regions in accordance with the first correspondence between the offset angles and the magnetic force adjustment regions acquired in advance, and adjusting the magnetic force from the at least one magnetic force adjustment region includes: selecting, by the magnetic levitation seat, the at least one magnetic force adjustment region corresponding to the offset angle from the N pairs of magnetic force adjustment regions in accordance with the first correspondence between the offset angles and the magnetic force adjustment regions acquired in advance; and adjusting, by the magnetic levitation seat, the magnetic force from the at least one magnetic force adjustment region using a magnetic force adjustment parameter corresponding to the offset angle in accordance with a second correspondence between the offset angles and the magnetic force adjustment parameters acquired in advance.

In a possible embodiment of the present disclosure, subsequent to the step of adjusting, by the magnetic levitation seat, the magnetic force from the corresponding region of the magnetic levitation seat in accordance with the offset angle, the method further includes receiving, by the magnetic levitation seat, balance information from the magnetic levitation object, and in the case that the balance information meets a predetermined condition, controlling the regions of the magnetic levitation seat to generate a substantially identical magnetic force.

In a possible embodiment of the present disclosure, an opening is provided at the central magnetic point of the magnetic levitation seat, and an infrared receiver is arranged in the opening. Prior to the step of receiving, by the magnetic levitation seat, the angular offset information from the magnetic levitation object, the method further includes, in the case that the magnetic levitation seat has received an infrared signal from the magnetic levitated object through the infrared receiver, transmitting to the magnetic levitation object indication information indicating that the magnetic levitation object is within an adjustable state.

In a possible embodiment of the present disclosure, in the case that the magnetic levitation member is the magnetic levitation seat and the other magnetic levitation member is the magnetic levitation object, the method includes: detecting, by the magnetic levitation object, an offset angle of the center of gravity of the magnetic levitation object relative to the central magnetic point of the magnetic levitation seat; and transmitting, by the magnetic levitation object, angular offset information to the magnetic levitation seat, so as to enable the magnetic levitation seat to determine the offset angle of the center of gravity of the magnetic levitation object relative to the central magnetic point of the magnetic levitation seat, and enable the magnetic levitation seat to adjust the magnetic force from the corresponding region of the magnetic levitation seat in accordance with the offset angle.

In a possible embodiment of the present disclosure, the magnetic levitation object is provided with a geomagnetic sensor, and the step of detecting, by the magnetic levitation object, the offset angle of the center of gravity of the magnetic levitation object relative to the central magnetic point of the magnetic levitation seat includes detecting, by the magnetic levitation object, the offset angle of the center of gravity of the magnetic levitation object relative to the central magnetic point of the magnetic levitation seat through the geomagnetic sensor.

In a possible embodiment of the present disclosure, subsequent to the step of transmitting, by the magnetic levitation object, the angular offset information to the magnetic levitation seat, the method further includes, in the case that the offset angle of the center of gravity of the magnetic levitation object relative to the central magnetic point of the magnetic levitation seat is within a predetermined range, transmitting balance information to the magnetic levitation seat, so as to enable the magnetic levitation seat to control the regions of the magnetic levitation seat to generate a substantially identical magnetic force.

In a possible embodiment of the present disclosure, an infrared transmitter is arranged at the center of gravity of the magnetic levitation object, and the magnetic levitation object is provided at the center of gravity with a transmission opening extending to a bottom of the magnetic levitation object. Prior to the step of detecting, by the magnetic levitation object, the offset angle of the center of gravity of the magnetic levitation objection relative to the central magnetic point of the magnetic levitation seat, the method further includes transmitting, by the infrared transmitter, an infrared signal to the magnetic levitation seat via the transmission opening. The step of detecting, by the magnetic levitation object, the offset angle of the center of gravity of the magnetic levitation object relative to the central magnetic force of the magnetic levitation seat includes, in the case that the magnetic levitation object has received from the magnetic levitation seat indication information indicating that the magnetic levitation object is in an adjustable state, detecting the offset angle of the center of gravity of the magnetic levitation object relative to the central magnetic point of the magnetic levitation seat.

In another aspect, the present disclosure provides in some embodiments a magnetic levitation seat, including a communication circuit, a processing circuit, an adjustment circuit and a magnetic force generation circuit. A data transmission end of the communication circuit is connected to a data transmission end of the processing circuit. The communication circuit is configured to receive angular offset information from a magnetic levitation object and transmit the angular offset information to the processing circuit. A control end of the processing circuit is connected to a receiving end of the adjustment circuit. The processing circuit is configured to determine an offset angle of a center of gravity of the magnetic levitation object relative to a central magnetic point of the magnetic levitation seat in accordance with the angular offset information, and generate a first control signal for adjusting a magnetic force from a corresponding region of the magnetic force generation circuit in accordance with the offset angle. An output end of the adjustment circuit is connected to an input end of the magnetic force generation circuit. The adjustment circuit is configured to transmit a first magnetic force adjustment signal to the magnetic force generation circuit in accordance with the first control signal, so as to adjust the magnetic force from the corresponding region of the magnetic force generation circuit.

In a possible embodiment of the present disclosure, the magnetic levitation seat is provided with N pairs of magnetic force adjustment regions, and the two magnetic force adjustment regions in each pair are arranged symmetric to each other about the central magnetic point, where N is an integer greater than or equal to 1. The magnetic levitation seat is configured to select at least one magnetic force adjustment region corresponding to the offset angle from the N pairs of magnetic force adjustment regions in accordance with a first correspondence between the offset angles and the magnetic force adjustment regions acquired in advance, and adjust the magnetic force from the at least one magnetic force adjustment region.

In a possible embodiment of the present disclosure, the magnetic levitation seat is configured to select the at least one magnetic force adjustment region corresponding to the offset angle from the N pairs of magnetic force adjustment regions in accordance with the first correspondence between the offset angles and the magnetic force adjustment regions acquired in advance, and adjust the magnetic force from the at least one magnetic force adjustment region using a magnetic force adjustment parameter corresponding to the offset angle in accordance with a second correspondence between the offset angles and the magnetic force adjustment parameters acquired in advance.

In a possible embodiment of the present disclosure, the magnetic levitation seat is further configured to receive balance information from the magnetic levitation object, and in the case that the balance information meets a predetermined condition, control the regions of the magnetic levitation seat to generate a substantially identical magnetic force.

In a possible embodiment of the present disclosure, an opening is provided at the central magnetic point of the magnetic levitation seat, and an infrared receiver is arranged in the opening. In the case that the magnetic levitation seat has received an infrared signal from the magnetic levitated object through the infrared receiver, the magnetic levitation seat is further configured to transmit to the magnetic levitation object indication information indicating that the magnetic levitation object is within an adjustable state.

In another aspect, the present disclosure provides in some embodiments a magnetic levitation object, including an angular offset detection circuit, a processing circuit and a communication circuit. An output end of the angular offset detection circuit is connected to an input end of the processing circuit. The angular offset detection circuit is configured to detect an offset angle of a center of gravity of the magnetic levitation object relative to a central magnetic point of a magnetic levitation seat, and transmit angular offset information about the offset angle to the processing circuit. A data transmission end of the processing circuit is connected to a data transmission end of the communication circuit. The processing circuit is configured to transmit a first control signal related to the angular offset information to the communication circuit in accordance with the angular offset information. The communication circuit is configured to transmit the angular offset information to the magnetic levitation seat in accordance with the first control signal, so as to enable the magnetic levitation seat to determine the offset angle of the center of gravity of the magnetic levitation object relative to the central magnetic point of the magnetic levitation seat, and enable the magnetic levitation seat to adjust a magnetic force from a corresponding region of the magnetic levitation seat in accordance with the offset angle.

In a possible embodiment of the present disclosure, the magnetic levitation object is provided with a geomagnetic sensor, and the magnetic levitation object is configured to detect the offset angle of the center of gravity of the magnetic levitation object relative to the central magnetic point of the magnetic levitation seat through the geomagnetic sensor.

In a possible embodiment of the present disclosure, in the case that the offset angle of the center of gravity of the magnetic levitation object relative to the central magnetic point of the magnetic levitation seat is within a predetermined range, the magnetic levitation object is configured to transmit balance information to the magnetic levitation seat, so as to enable the magnetic levitation seat to control the regions of the magnetic levitation seat to generate a substantially identical magnetic force.

In a possible embodiment of the present disclosure, an infrared transmitter is arranged at the center of gravity of the magnetic levitation object, and the magnetic levitation object is provided at the center of gravity with a transmission opening extending to a bottom of the magnetic levitation object.

In a possible embodiment of the present disclosure, the infrared transmitter is configured to transmit an infrared signal to the magnetic levitation seat via the transmission opening. In the case that the magnetic levitation object has received from the magnetic levitation seat indication information indicating that the magnetic levitation object is in an adjustable state, the magnetic levitation object is further configured to detect the offset angle of the center of gravity of the magnetic levitation object relative to the central magnetic point of the magnetic levitation seat.

BRIEF DESCRIPTION OF THE DRAWINGS

FIG. 8 is another schematic view showing the magnetic force adjustment region of the magnetic levitation seat according to one embodiment of the present disclosure;

FIG. 9 is a schematic view showing the magnetic levitation object in the offset state according to one embodiment of the present disclosure;

FIG. 10 is a schematic view showing a balance state of the magnetic levitation object according to one embodiment of the present disclosure;

FIG. 11 is yet another flow chart of the method for controlling the magnetic levitation object according to one embodiment of the present disclosure;

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

Figure 1:
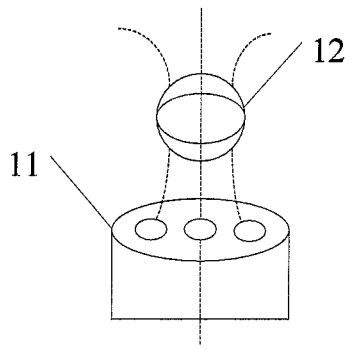
FIG. 1 is a schematic view of a magnetic levitation system according to one embodiment of the present disclosure.

As shown in FIG. 1, which is a schematic view showing a magnetic levitation system according to one embodiment of the present disclosure, the magnetic levitation system includes a magnetic levitation seat 11 and a magnetic levitation object 12. The magnetic levitation seat 11 is configured to generate a magnetic force, so as to enable the magnetic levitation object to be levitated in the air. In the embodiments of the present disclosure, the magnetic levitation object 12 may include, but not limited to, magnetic levitation sound equipment, magnetic levitation toys, magnetic levitation decorations or magnetic levitation communication devices. The magnetic levitation seat 11 is used to provide the magnetic force to the magnetic levitation object 12.

Figure 2:
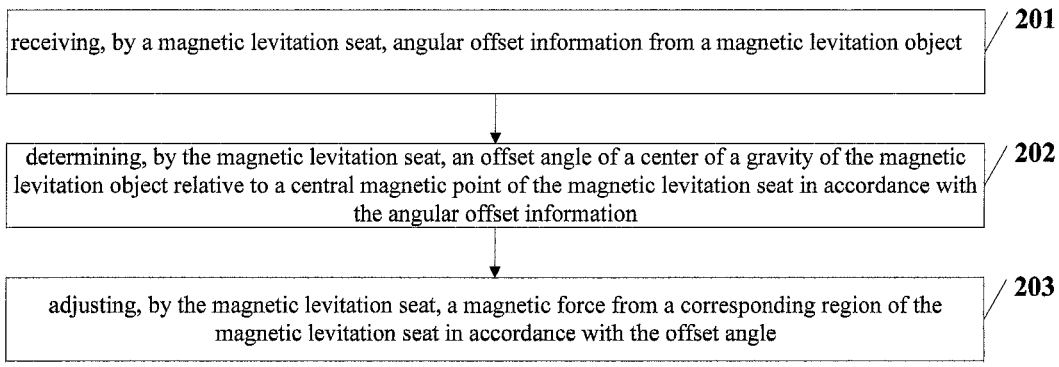
FIG. 2 is a flow chart of a method for controlling a magnetic levitation object according to one embodiment of the present disclosure.

As shown in FIG. 2, which is a flow chart of a method for controlling a magnetic levitation object according to one embodiment of the present disclosure, the method includes: Step 201 of receiving, by a magnetic levitation seat, angular offset information from the magnetic levitation object; Step 202 of determining, by the magnetic levitation seat, an offset angle of a center of a gravity of the magnetic levitation object relative to a central magnetic point of the magnetic levitation seat in accordance with the angular offset information; and Step 203 of adjusting, by the magnetic levitation seat, a magnetic force from a corresponding region of the magnetic levitation seat in accordance with the offset angle.

The angular offset information may include the offset angle of the center of gravity of the magnetic levitation object relative to the central magnetic point of the magnetic levitation seat. The central magnetic point of the magnetic levitation seat may be a center of a magnetic force generation region of the magnetic levitation seat, or a center of the magnetic levitation seat. In addition, the central magnetic point may also be understood as a sensing point for the center of gravity of the magnetic levitation object.

In addition, the angular offset information may be transmitted by the magnetic levitation object to the magnetic levitation seat in a short-range communication manner, e.g., Bluetooth. In the case that the magnetic levitation seat has received the angular offset information, it may determine the offset angle of the center of gravity of the magnetic levitation object relative to the central magnetic point of the magnetic levitation seat, e.g., whether or not the center of gravity of the magnetic levitation object is offset toward to the left, to the right or at a certain inclination angle. Next, the magnetic levitation seat may adjust the magnetic force from the corresponding region of the magnetic levitation seat in accordance with the offset angle, e.g., select the magnetic force generation region corresponding to the offset angle and increase or decrease the magnetic force from the magnetic force generation region.

Through the above-mentioned steps, it is able to adjust the magnetic force from the magnetic levitation seat in accordance with the offset angle of the center of gravity of the magnetic levitation object relative to the central magnetic point of the magnetic levitation seat, so as to improve the stability of the magnetic levitation object. In addition, in the embodiments of the present disclosure, the above three steps may be repeated, so as to adjust the magnetic force from the corresponding region repeatedly until the magnetic levitation object is in a stable state or the center of gravity of the magnetic levitation object is substantially in alignment with the central magnetic point of the magnetic levitation seat.

According to the embodiments of the present disclosure, the magnetic levitation seat receives the angular offset information from the magnetic levitation seat, determines the offset angle of the center of gravity of the magnetic levitation object relative to the central magnetic point of the magnetic levitation seat in accordance with the angular offset information, and adjust the magnetic force from the corresponding region of the magnetic levitation seat in accordance with the offset angle. In this way, it is able to adjust the magnetic force in accordance with the offset angle, thereby to improve the stability of the magnetic levitation object.

Figure 3:
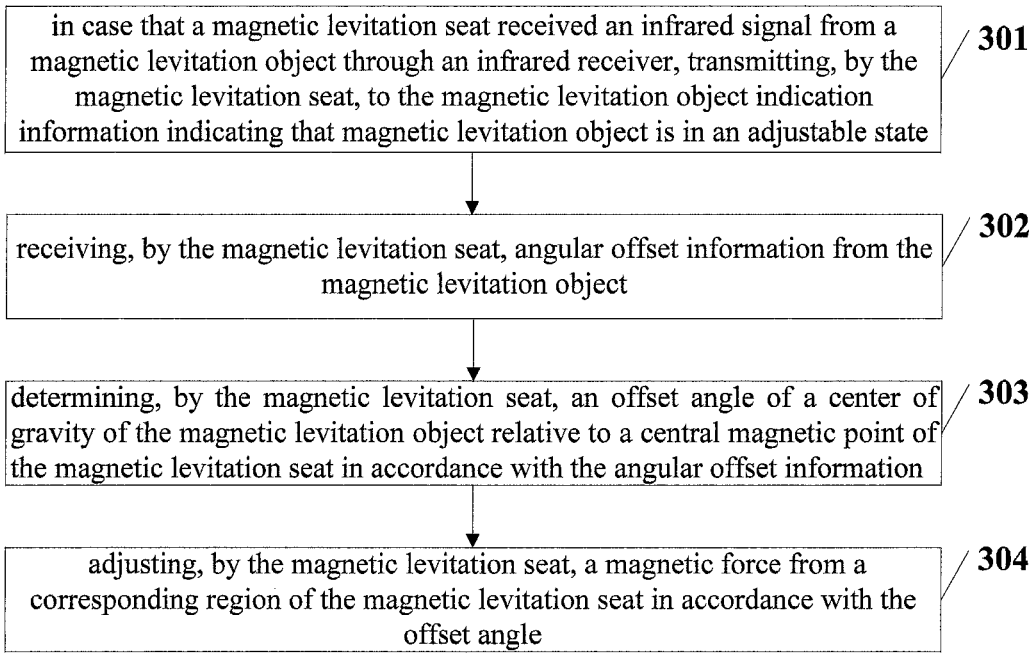
FIG. 3 is another flow chart of the method for controlling the magnetic levitation object according to one embodiment of the present disclosure.

Referring to FIG. 3, which is a flow chart of a method for controlling a magnetic levitation object, the method includes: Step 301 of, in the case that a magnetic levitation seat has received an infrared signal from a magnetic levitation object through an infrared receiver, transmitting, by the magnetic levitation seat, to the magnetic levitation object indication information indicating that the magnetic levitation object is in an adjustable state; Step 302 of receiving, by the magnetic levitation seat, angular offset information from the magnetic levitation object; Step 303 of determining, by the magnetic levitation seat, an offset angle of a center of gravity of the magnetic levitation object relative to a central magnetic point of the magnetic levitation seat in accordance with the angular offset information; and Step 304 of adjusting, by the magnetic levitation seat, a magnetic force from a corresponding region of the magnetic levitation seat in accordance with the offset angle.

Figure 4:
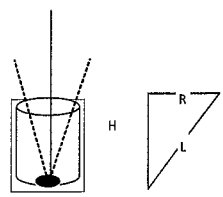
FIG. 4 is a schematic view showing an infrared reception opening of a magnetic levitation seat according to one embodiment of the present disclosure.

In the embodiments of the present disclosure, an opening is provided at the central magnetic point of the magnetic levitation seat, and the infrared receiver is arranged in the opening. For example, FIG. 4 shows a size and a depth of the opening. In the case that a radius of the opening, i.e., a distance between the central magnetic point of the magnetic levitation seat and an edge of the opening, is R and a depth of a position of the infrared receiver is H, it is able to calculate a maximum offset angle θ of the magnetic levitation object relative to the opening using the equation θ=arctan(R/L). In this way, it is able to reasonably adjust the size and the depth of the opening in accordance with the position of the magnetic point. In the case that an infrared light beam from the magnetic levitation object is capable of passing through the opening in the magnetic levitation seat, it means that the magnetic levitation object is in the adjustable state or a transient adjustable state. In addition, the indication information may also be called as alignment information.

Figure 5:
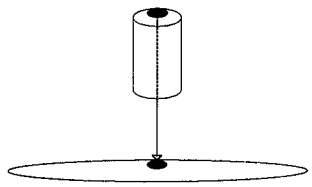
FIG. 5 is a schematic view showing an infrared transmission opening of the magnetic levitation object according to one embodiment of the present disclosure.

In addition, in the embodiments of the present disclosure, an infrared transmitter may be arranged at the center of gravity of the magnetic levitation object, and the magnetic levitation object may be provided at the center of gravity with a transmission opening extending to a bottom of the magnetic levitation object. For example, FIG. 5 shows a situation where the infrared light beam from the magnetic levitation seat vertically reaches the center of gravity. Depending on a principle of determining a straight line through two points, the infrared light beam from the center of gravity of the magnetic levitation object may pass through the transmission opening at the bottom of the magnetic levitation object. Through this design, the infrared receiver is built in the magnetic levitation seat, and in the case that the offset angle of the center of gravity of the magnetic levitation object related to the central magnetic point of the magnetic levitation seat is within such a reasonable range that the infrared light beam is capable of being received by the infrared receiver, it is able to adjust the magnetic force.

Through Step 301, it is able to adjust the magnetic force merely in the case that the infrared light beam from the magnetic levitation object has been received, thereby to reduce the power consumption of the magnetic levitation seat. Of course, in the embodiments of the present disclosure, Step 301 may also be omitted.

In addition, the angular offset information may include the offset angle of the center of gravity of the magnetic levitation object relative to the central magnetic point of the magnetic levitation seat detected by the magnetic levitation object using a geomagnetic sensor or a spatial attitude sensor.

In a possible embodiment of the present disclosure, the magnetic levitation seat is provided with N pairs of magnetic force adjustment regions, and the two magnetic force adjustment regions in each pair are arranged symmetric to each other about the central magnetic point, where N is an integer greater than or equal to 1.

The step of adjusting, by the magnetic levitation seat, the magnetic force from the corresponding region of the magnetic levitation seat in accordance with the offset angle includes: selecting, by the magnetic levitation seat, at least one magnetic force adjustment region corresponding to the offset angle from the N pairs of magnetic force adjustment regions in accordance with a first correspondence between the offset angles and the magnetic force adjustment regions acquired in advance, and adjusting the magnetic force from the at least one magnetic force adjustment region.

Figure 6:
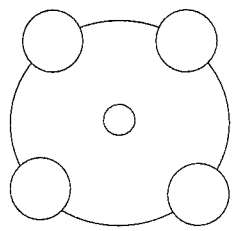
FIG. 6 is a schematic view showing a magnetic force adjustment region of the magnetic levitation seat according to one embodiment of the present disclosure.

For example, as shown in FIG. 6, the magnetic levitation seat is provided with two pairs of magnetic force adjustment regions, and the four magnetic force adjustment regions are arranged symmetric to each other about the central magnetic point and arranged at a surface of the magnetic levitation seat in such a manner as a square inscribed in a circle. In this way, it is able to adjust the magnetic force from the corresponding region even in the case that the magnetic levitation object moves in any direction, thereby to improve the stability of the magnetic levitation object. In addition, prior to the adjustment, the magnetic forces from the magnetic force adjustment regions are substantially equal to each other.

In addition, the first correspondence may be preset by a user or automatically configured by the magnetic levitation seat, which will not be particularly defined herein. The adjustment may include increasing the magnetic force from the at least one magnetic force adjustment region, e.g., in the case that the magnetic levitation object is offset toward a certain direction, the magnetic force from the corresponding region in this direction may be increased. Further, the adjustment may also include decreasing the magnetic force from the at least one magnetic force adjustment region, e.g., in the case that the magnetic levitation object is offset toward a certain direction, the magnetic force from the corresponding region in a direction opposite to this direction may be decreased. Moreover, the magnetic force from the at least one magnetic force adjustment region may be adjusted in a Pulse Width Modulation (PWM) manner.

Figure 7:
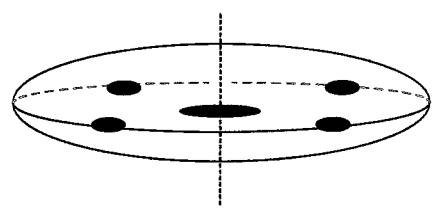
FIG. 7 is a schematic view showing an offset state of the magnetic levitation object according to one embodiment of the present disclosure.

The adjustment of the magnetic force from the magnetic levitation seat will be described hereinafter in more details in conjunction with FIGS. 7 to 10. FIG. 7 shows the magnetic force adjustment regions (also called as magnetic points) of the magnetic levitation seat. A white region in FIG. 7 represents the magnetic levitation object that has been offset, and a region containing five points is an imaginary region parallel to the magnetic levitation seat. As shown in FIG. 7, a vertical line passing through the center of gravity of the magnetic levitation object is angled relative to a center line connecting a center of the magnetic levitation object and a center of the magnetic levitation seat (this center line may also be understood as a center line vertically passing through the central magnetic point). At this time, the magnetic forces from the four magnetic force adjustment regions in FIG. 8 may be adjusted in a PWM manner. FIG. 9 shows equivalent resultant forces on the basis of merely one diagonal line. In FIG. 9, G represents the central magnetic point. In the case that F1*L1>F2*L2, the magnetic levitation object may be offset because the vertical line passing through the center of gravity of the magnetic levitation object is parallel to the center line, resulting in a change in an arm of force and an off-balance state. At this time, an offset amount of the magnetic levitation object may be detected by the geomagnetic sensor and transmitted to the magnetic levitation seat, so as to adjust the magnetic force and enable the magnetic levitation object to be levitated at a desired position as shown in FIG. 10. At this time, F1*L=F2*L. F1 and F2 each represents a size of the magnetic force, and L1, L2 and L each represents the arm of force. During the adjustment, as shown in FIG. 9, in the case that the off-balance phenomenon occurs for the magnetic levitation object, F1 may be increased, so as to adjust the offset amount. Through the continuous closed-loop feedback control, it is able to achieve a balance state as shown in FIG. 10.

It should be appreciated that, a closed-loop control algorithm is adopted above. In the closed-loop control algorithm, an angle feedback control method is used, so as to adjust a size of the arm of force for each of the two diagonal lines, thereby to enable the center of gravity of the magnetic levitation object to substantially coincide with the center of the magnetic levitation object and the center of the magnetic levitation seat, and enable sizes of magnetic torques to be substantially equal to each other.

In the embodiments of the present disclosure, it is able to adjust the magnetic force at the corresponding region in accordance with the first correspondence, thereby to rapidly enable the magnetic levitation object to be in a stable state. It should be appreciated that, apart from the first correspondence, the corresponding magnetic force adjustment region may also be calculated through offset demodulation for the subsequent adjustment.

In a possible embodiment of the present disclosure, the step of selecting, by the magnetic levitation seat, the at least one magnetic force adjustment region corresponding to the offset angle from the N pairs of magnetic force adjustment regions in accordance with the first correspondence between the offset angles and the magnetic force adjustment regions acquired in advance, and adjusting the magnetic force from the at least one magnetic force adjustment region includes: selecting, by the magnetic levitation seat, the at least one magnetic force adjustment region corresponding to the offset angle from the N pairs of magnetic force adjustment regions in accordance with the first correspondence between the offset angles and the magnetic force adjustment regions acquired in advance; and adjusting, by the magnetic levitation seat, the magnetic force from the at least one magnetic force adjustment region using a magnetic force adjustment parameter corresponding to the offset angle in accordance with a second correspondence between the offset angles and the magnetic force adjustment parameters acquired in advance.

In the embodiments of the present disclosure, the second correspondence may be preset by a user or automatically configured by the magnetic levitation seat. For example, a magnetic force at a specific size may be increased or decreased. In addition, the magnetic levitation object may be adjusted to be in a balance state, i.e., from an offset position to the balance state, through merely one adjustment operation in accordance with a magnetic force adjustment parameter represented by the second correspondence. In a possible embodiment of the present disclosure, the magnetic levitation object may be adjusted from the offset position to the balance state through several adjustment operations in accordance with the magnetic force adjustment parameter.

In the embodiments of the present disclosure, through the second correspondence, it is able to rapidly and accurately adjust the magnetic levitation object to the balance state. In addition, it should be appreciated that, the magnetic force may be increased or decreased, depending on different magnetic force adjustment regions.

In a possible embodiment of the present disclosure, subsequent to the step of adjusting, by the magnetic levitation seat, the magnetic force from the corresponding region of the magnetic levitation seat in accordance with the offset angle, the method further includes: receiving, by the magnetic levitation seat, balance information from the magnetic levitation object, and in the case that the balance information meets a predetermined condition, controlling the regions of the magnetic levitation seat to generate a substantially identical magnetic force.

The balance information is used to indicate that the offset angle of the center of gravity of the magnetic levitation object relative to the central magnetic point of the magnetic levitations eat is within a predetermined range. For example, in the case that the center of gravity of the magnetic levitation object is in alignment with the central magnetic point of the magnetic levitation seat, the magnetic levitation object is in the balance state, i.e., the vertical line passing through the center of gravity of the magnetic levitation object coincides with the center line of the magnetic levitation seat.

According to the embodiments of the present disclosure, in the case that the magnetic levitation object in the balance state, it is able for the magnetic levitation seat to generate the substantially equal magnetic force at different regions, thereby to maintain the magnetic levitation object to be in the balance state.

As compared with the embodiment shown in FIG. 2, the step of transmitting the indication information is added, so as to reduce the power consumption of the magnetic levitation seat while improving the stability of the magnetic levitation object.

As shown in FIG. 11, which is a flow chart of a method for controlling a magnetic levitation object, the method includes: Step 1101 of detecting, by the magnetic levitation object, an offset angle of a center of gravity of the magnetic levitation object relative to a central magnetic point of a magnetic levitation seat; and Step 1102 of transmitting, by the magnetic levitation object, angular offset information to the magnetic levitation seat, so as to enable the magnetic levitation seat to determine the offset angle of the center of gravity of the magnetic levitation object relative to the central magnetic point of the magnetic levitation seat, and enable the magnetic levitation seat to adjust a magnetic force from a corresponding region of the magnetic levitation seat in accordance with the offset angle.

In a possible embodiment of the present disclosure, the magnetic levitation object is provided with a geomagnetic sensor, and the step of detecting, by the magnetic levitation object, the offset angle of the center of gravity of the magnetic levitation object relative to the central magnetic point of the magnetic levitation seat includes detecting, by the magnetic levitation object, the offset angle of the center of gravity of the magnetic levitation object relative to the central magnetic point of the magnetic levitation seat through the geomagnetic sensor.

In a possible embodiment of the present disclosure, subsequent to the step of transmitting, by the magnetic levitation object, the angular offset information to the magnetic levitation seat, the method further includes, in the case that the offset angle of the center of gravity of the magnetic levitation object relative to the central magnetic point of the magnetic levitation seat is within a predetermined range, transmitting balance information to the magnetic levitation seat, so as to enable the magnetic levitation seat to control the regions of the magnetic levitation seat to generate a substantially identical magnetic force.

In a possible embodiment of the present disclosure, an infrared transmitter is arranged at the center of gravity of the magnetic levitation object, and the magnetic levitation object is provided at the center of gravity with a transmission opening extending to a bottom of the magnetic levitation object.

Prior to the step of detecting, by the magnetic levitation object, the offset angle of the center of gravity of the magnetic levitation objection relative to the central magnetic point of the magnetic levitation seat, the method further includes transmitting, by the infrared transmitter, an infrared signal to the magnetic levitation seat via the transmission opening.

The step of detecting, by the magnetic levitation object, the offset angle of the center of gravity of the magnetic levitation object relative to the central magnetic force of the magnetic levitation seat includes, in the case that the magnetic levitation object has received from the magnetic levitation seat indication information indicating that the magnetic levitation object is in an adjustable state, detecting the offset angle of the center of gravity of the magnetic levitation object relative to the central magnetic point of the magnetic levitation seat.

It should be appreciated that, the implementation of the method in the embodiments of the present disclosure may also refer to those in the embodiments as shown in FIG. 2 and FIG. 3 with an identical beneficial effect, which will not be particularly defined herein.

Figure 12:
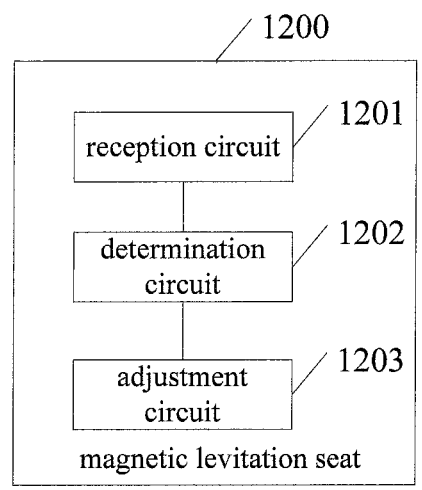
FIG. 12 is a schematic view showing the magnetic levitation seat according to one embodiment of the present disclosure.

As shown in FIG. 12, the present disclosure provides in some embodiments a magnetic levitation seat 1200, which includes: a reception circuit 1201 configured to receive angular offset information from a magnetic levitation object; a determination circuit 1202 configured to determine an offset angle of a center of gravity of the magnetic levitation object relative to a central magnetic point of the magnetic levitation seat in accordance with the angular offset information; and an adjustment circuit 1203 configured to adjust a magnetic force from a corresponding region of the magnetic levitation seat in accordance with the offset angle.

In a possible embodiment of the present disclosure, the magnetic levitation seat is provided with N pairs of magnetic force adjustment regions, and the two magnetic force adjustment regions in each pair are arranged symmetric to each other about the central magnetic point, where N is an integer greater than or equal to 1.

The adjustment circuit 1203 is further configured to select at least one magnetic force adjustment region corresponding to the offset angle from the N pairs of magnetic force adjustment regions in accordance with a first correspondence between the offset angles and the magnetic force adjustment regions acquired in advance, and adjust the magnetic force from the at least one magnetic force adjustment region.

In a possible embodiment of the present disclosure, the adjustment circuit 1203 is further configured to select the at least one magnetic force adjustment region corresponding to the offset angle from the N pairs of magnetic force adjustment regions in accordance with the first correspondence between the offset angles and the magnetic force adjustment regions acquired in advance, and adjust the magnetic force from the at least one magnetic force adjustment region using a magnetic force adjustment parameter corresponding to the offset angle in accordance with a second correspondence between the offset angles and the magnetic force adjustment parameters acquired in advance.

Figure 13:
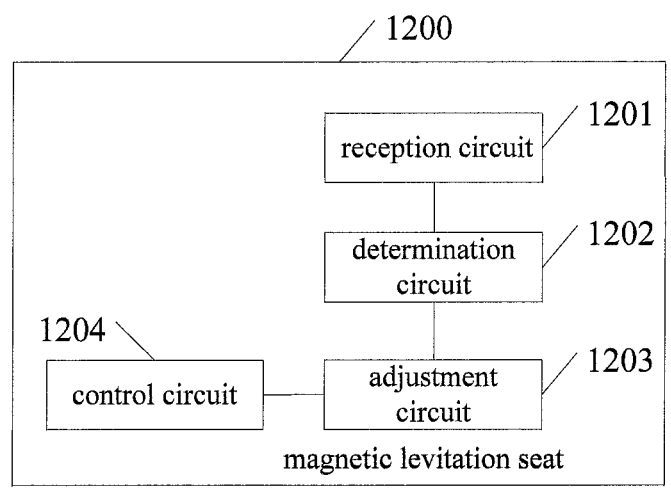
FIG. 13 is another schematic view showing the magnetic levitation seat according to one embodiment of the present disclosure.

In a possible embodiment of the present disclosure, as shown in FIG. 13, the magnetic levitation seat 1200 further includes a control circuit 1204 configured to receive balance information from the magnetic levitation object, and in the case that the balance information meets a predetermined condition, control the regions of the magnetic levitation seat to generate a substantially identical magnetic force.

Figure 14:
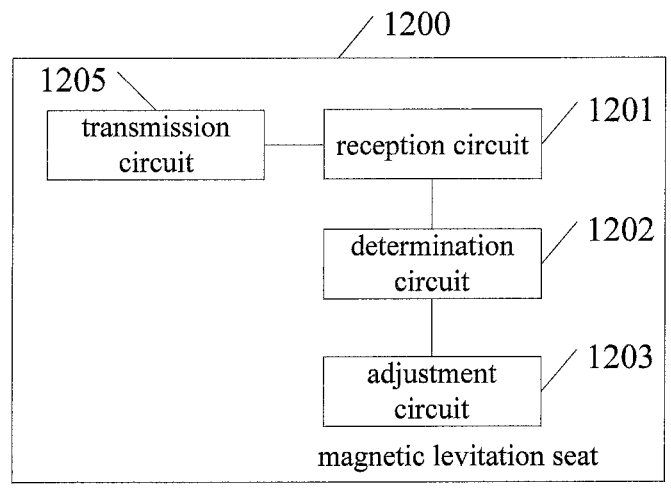
FIG. 14 is yet another schematic view showing the magnetic levitation seat according to one embodiment of the present disclosure.

In a possible embodiment of the present disclosure, as shown in FIG. 14, the magnetic levitation seat 1200 further includes a transmission circuit 1205 configured to, in the case that the magnetic levitation seat has received an infrared signal from the magnetic levitated object through the infrared receiver, transmit to the magnetic levitation object indication information indicating that the magnetic levitation object is within an adjustable state.

It should be appreciated that, the magnetic levitation seat 1200 may be used to implement the above-mentioned method with an identical or similar beneficial effect, which will not be particularly defined herein.

Figure 15:
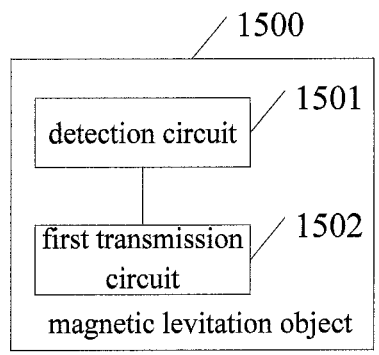
FIG. 15 is a schematic view showing the magnetic levitation object according to one embodiment of the present disclosure.

As shown in FIG. 15, the present disclosure provides in some embodiments a magnetic levitation object 1500, which includes: a detection circuit 1501 configured to detect an offset angle of a center of gravity of the magnetic levitation object relative to a central magnetic point of a magnetic levitation seat; and a first transmission circuit 1502 configured to transmit angular offset information to the magnetic levitation seat, so as to enable the magnetic levitation seat to determine the offset angle of the center of gravity of the magnetic levitation object relative to the central magnetic point of the magnetic levitation seat, and enable the magnetic levitation seat to adjust a magnetic force from a corresponding region of the magnetic levitation seat in accordance with the offset angle.

In a possible embodiment of the present disclosure, the magnetic levitation object 1500 is provided with a geomagnetic sensor (not shown), and the detection circuit 1501 is further configured to detect the offset angle of the center of gravity of the magnetic levitation object relative to the central magnetic point of the magnetic levitation seat through the geomagnetic sensor.

Figure 16:
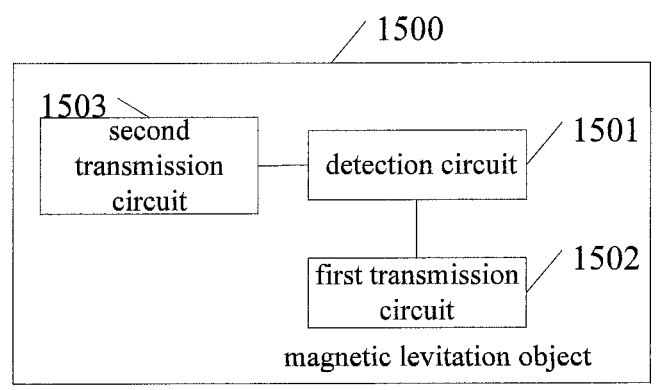
FIG. 16 is another schematic view showing the magnetic levitation object according to one embodiment of the present disclosure.

In a possible embodiment of the present disclosure, as shown in FIG. 16, the magnetic levitation object 1500 further includes a second transmission circuit 1503 configured to, in the case that the offset angle of the center of gravity of the magnetic levitation object relative to the central magnetic point of the magnetic levitation seat is within a predetermined range, transmit balance information to the magnetic levitation seat, so as to enable the magnetic levitation seat to control the regions of the magnetic levitation seat to generate a substantially identical magnetic force.

In a possible embodiment of the present disclosure, an infrared transmitter (not shown) is arranged at the center of gravity of the magnetic levitation object, and the magnetic levitation object is provided at the center of gravity with a transmission opening (not shown) extending to a bottom of the magnetic levitation object.

Figure 17:
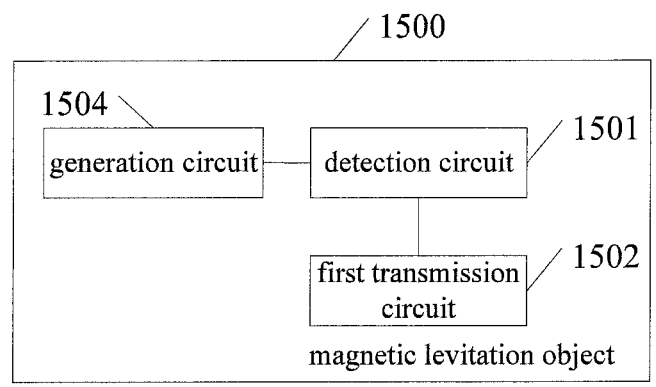
FIG. 17 is yet another schematic view showing the magnetic levitation object according to one embodiment of the present disclosure.

As shown in FIG. 17, the magnetic levitation object 1500 further includes: a generation circuit 1504 configured to generate through the infrared transmitter an infrared signal to the magnetic levitation seat via the transmission opening. The detection circuit 1501 is further configured to, in the case that the magnetic levitation object has received from the magnetic levitation seat indication information indicating that the magnetic levitation object is in an adjustable state, detect the offset angle of the center of gravity of the magnetic levitation object relative to the central magnetic point of the magnetic levitation seat.

It should be appreciated that, the magnetic levitation object 1500 may be used to implement the above-mentioned method with an identical beneficial effect, which will not be particularly defined herein.

Figure 18:
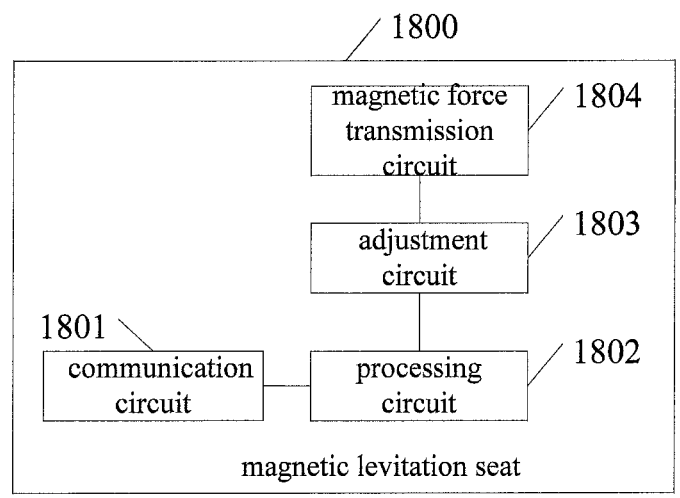
FIG. 18 still yet another schematic view showing the magnetic levitation seat according to one embodiment of the present disclosure.

As shown in FIG. 18, the present disclosure provides in some embodiments a magnetic levitation seat 1800, which includes a communication circuit 1801, a processing circuit 1802, an adjustment circuit 1803 and a magnetic force generation circuit 1804. A data transmission end of the communication circuit 1801 is connected to a data transmission end of the processing circuit 1802. The communication circuit 1801 is configured to receive angular offset information from a magnetic levitation object and transmit the angular offset information to the processing circuit. A control end of the processing circuit 1802 is connected to a receiving end of the adjustment circuit 1803. The processing circuit 1802 is configured to determine an offset angle of a center of gravity of the magnetic levitation object relative to a central magnetic point of the magnetic levitation seat in accordance with the angular offset information, and generate a first control signal for adjusting a magnetic force from a corresponding region of the magnetic force generation circuit 1804 in accordance with the offset angle. An output end of the adjustment circuit 1803 is connected to an input end of the magnetic force generation circuit 1804. The adjustment circuit 1803 is configured to transmit a first magnetic force adjustment signal to the magnetic force generation circuit 1804 in accordance with the first control signal, so as to adjust the magnetic force from the corresponding region of the magnetic force generation circuit 1804.

Figure 19:
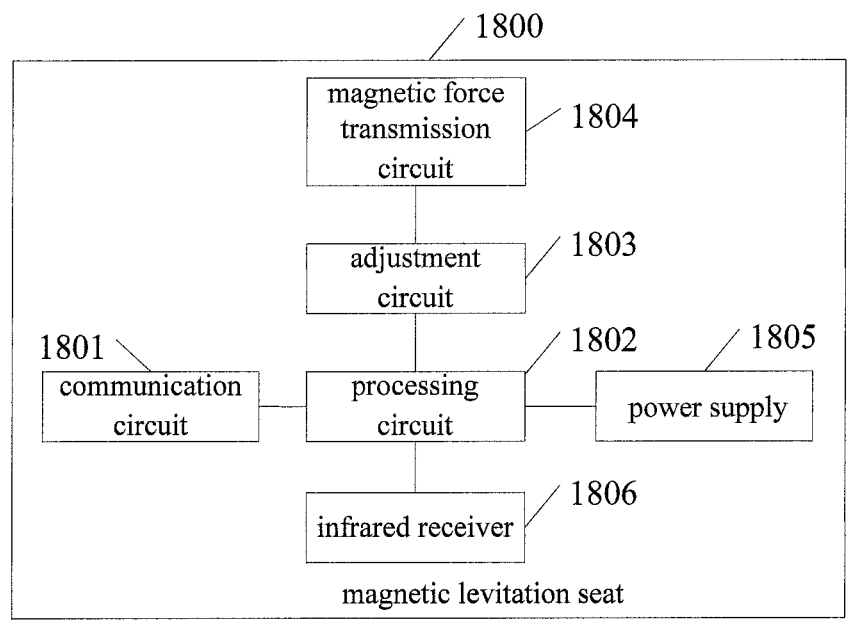
FIG. 19 is still yet another schematic view showing the magnetic levitation seat according to one embodiment of the present disclosure.

The communication circuit 1801 may be a Bluetooth reception circuit, the processing circuit 1802 may be a Microcontroller Unit (MCU), the adjustment circuit 1803 may be a PWM adjustment element, and the magnetic force generation circuit 1804 may be a magnetic force generation module. Of course, in a possible embodiment of the present disclosure, as shown in FIG. 19, the magnetic levitation seat 1800 may further include a power supply (PS) 1805.

In a possible embodiment of the present disclosure, the magnetic force generation circuit 1804 includes N pairs of magnetic force adjustment regions, and the two magnetic force adjustment regions in each pair are arranged symmetric to each other about the central magnetic point, where N is an integer greater than or equal to 1.

The processing circuit 1802 is further configured to select at least one magnetic force adjustment region corresponding to the offset angle from the N pairs of magnetic force adjustment regions in accordance with a first correspondence between the offset angles and the magnetic force adjustment regions acquired in advance, generate a first control signal for adjusting the magnetic force from the at least one magnetic force adjustment region, and transmit the first control signal to the adjustment circuit 1803.

In a possible embodiment of the present disclosure, the processing circuit 1802 is further configured to select the at least one magnetic force adjustment region corresponding to the offset angle from the N pairs of magnetic force adjustment regions in accordance with the first correspondence between the offset angles and the magnetic force adjustment regions acquired in advance, generate a first control signal for adjusting the magnetic force from the at least one magnetic force adjustment region using a magnetic force adjustment parameter corresponding to the offset angle in accordance with a second correspondence between the offset angles and the magnetic force adjustment parameters acquired in advance, and transmit the first control signal to the adjustment circuit 1803.

In a possible embodiment of the present disclosure, the communication circuit 1801 is further configured to receive balance information from the magnetic levitation object, and transmit the balance information to the processing circuit 1802.

The processing circuit 1802 is further configured to generate a second control signal for controlling the regions of the magnetic levitation seat to generate a substantially identical magnetic force, and transmit the second control signal to the adjustment circuit.

The adjustment circuit 1803 is further configured to transmit a second adjustment signal to the magnetic force transmission circuit in accordance with the second control signal, so as to enable the regions of the magnetic force transmission circuit 1804 to generate the substantially identical magnetic force.

In a possible embodiment of the present disclosure, an opening (not shown) is provided at the central magnetic point of the magnetic levitation seat, and an infrared receiver 1806 is arranged in the opening. As shown in FIG. 19, the infrared receiver 1806 is connected to the processing circuit 1802, and configured to receive an infrared signal from the magnetic levitation object and transmit to the processing circuit 1802 an indication signal indicating that the infrared signal has been received. The processing circuit 1802 is further configured to generate indication information indicating that the magnetic levitation object is within an adjustable state in accordance with the indication signal, and transmit the indication information to the communication circuit 1801. The communication circuit 1801 is further configured to transmit the indication information to the magnetic levitation object.

It should be appreciated that, the magnetic levitation seat 1800 may be used to implement the above-mentioned method with an identical or similar beneficial effect, which will not be particularly defined herein.

Figure 20:
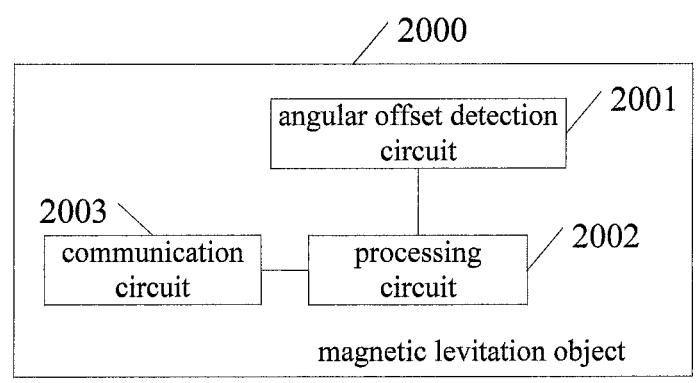
FIG. 20 is still yet another schematic view showing the magnetic levitation object according to one embodiment of the present disclosure.

As shown in FIG. 20, the present disclosure provides in some embodiments a magnetic levitation object 2000, which includes an angular offset detection circuit 2001, a processing circuit 2002 and a communication circuit 2003. An output end of the angular offset detection circuit 2001 is connected to an input end of the processing circuit 2002. The angular offset detection circuit 2001 is configured to detect an offset angle of a center of gravity of the magnetic levitation object relative to a central magnetic point of a magnetic levitation seat, and transmit angular offset information about the offset angle to the processing circuit 2002.

A data transmission end of the processing circuit 2002 is connected to a data transmission end of the communication circuit 2003. The processing circuit 2002 is configured to transmit a first control signal related to the angular offset information to the communication circuit 2003 in accordance with the angular offset information. The communication circuit 2003 is configured to transmit the angular offset information to the magnetic levitation seat in accordance with the first control signal, so as to enable the magnetic levitation seat to determine the offset angle of the center of gravity of the magnetic levitation object relative to the central magnetic point of the magnetic levitation seat, and enable the magnetic levitation seat to adjust a magnetic force from a corresponding region of the magnetic levitation seat in accordance with the offset angle.

Figure 21:
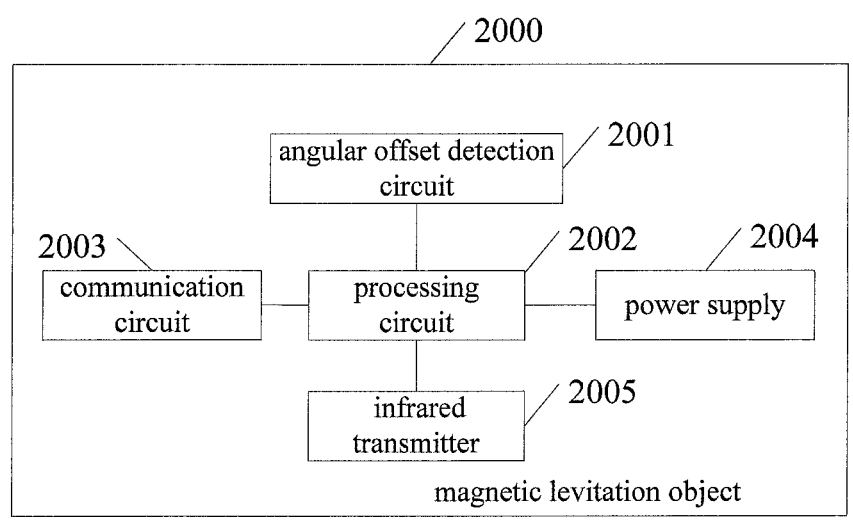
FIG. 21 is still yet another schematic view showing the magnetic levitation object according to one embodiment of the present disclosure.

The communication circuit 2003 may be a Bluetooth reception circuit, the processing circuit 2002 may be an MCU, and the angular offset detection circuit 2001 may be a geomagnetic sensor. Of course, as shown in FIG. 21, the magnetic levitation object 2000 may further include a PS 2004.

In a possible embodiment of the present disclosure, the processing circuit 2002 is further configured to, in the case that the offset angle of the center of gravity of the magnetic levitation object relative to the central magnetic point of the magnetic levitation seat detected by the angular offset detection circuit 2001 is within a predetermined range, transmit a second control signal for transmitting balance information to the communication circuit 2003. The communication circuit 2003 is further configured to transmit the balance information to the magnetic levitation seat in accordance with the second control signal, so as to enable the magnetic levitation seat to control the regions of the magnetic levitation seat to generate a substantially identical magnetic force.

In a possible embodiment of the present disclosure, an infrared transmitter is arranged at the center of gravity of the magnetic levitation object, and the magnetic levitation object is provided at the center of gravity with a transmission opening extending to a bottom of the magnetic levitation object. The infrared transmitter is configured to transmit an infrared signal to the magnetic levitation seat via the transmission opening.

The communication circuit 2003 is further configured to receive from the magnetic levitation seat indication information indicating that the magnetic levitation object is within an adjustable state, and transmit the indication information to the processing circuit 2002.

The processing circuit 2002 is further configured to transmit a trigger signal for triggering the detection of the offset angle to the angular offset detection circuit 2001 in accordance with the indication information, so as to trigger the angular offset detection circuit to detect the offset angle of the center of gravity of the magnetic levitation object relative to the central magnetic point of the magnetic levitation seat.

In addition, as shown in FIG. 21, the infrared transmitter 2005 may be connected to the processing circuit 2002.

It should be appreciated that, the magnetic levitation object 2000 may be used to implement the above-mentioned method with an identical or similar beneficial effect, which will not be particularly defined herein.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for controlling a magnetic levitation member, comprising:
    acquiring, by the magnetic levitation member, an offset angle of a center of gravity of another magnetic levitation member relative to a central magnetic point of the magnetic levitation member; and
    adjusting, by the magnetic levitation member, a magnetic force from a corresponding region of the magnetic levitation member in accordance with the offset angle;
    wherein the magnetic levitation member is the magnetic levitation seat and the other magnetic levitation member is the magnetic levitation object, the method comprises:
    detecting, by the magnetic levitation object, an offset angle of the center of gravity of the magnetic levitation object relative to the central magnetic point of the magnetic levitation seat; and
    transmitting, by the magnetic levitation object, angular offset information to the magnetic levitation seat, so as to enable the magnetic levitation seat to determine the offset angle of the center of gravity of the magnetic levitation object relative to the central magnetic point of the magnetic levitation seat, and enable the magnetic levitation seat to adjust the magnetic force from the corresponding region of the magnetic levitation seat in accordance with the offset angle.

2. The method according to claim 1, wherein the magnetic levitation member is a magnetic levitation seat and the other magnetic levitation member is a magnetic levitation object, the method comprises:
    receiving, by the magnetic levitation seat, angular offset information from the magnetic levitation object;
    determining, by the magnetic levitation seat, an offset angle of a center of gravity of the magnetic levitation object relative to a central magnetic point of the magnetic levitation seat; and adjusting, by the magnetic levitation seat, a magnetic force from a corresponding region of the magnetic levitation seat in accordance with the offset angle.

3. The method according to claim 2, wherein the magnetic levitation seat is provided with N pairs of magnetic force adjustment regions, and the two magnetic force adjustment regions in each pair are arranged symmetric to each other about the central magnetic point, where N is an integer greater than or equal to 1; and the step of adjusting, by the magnetic levitation seat, the magnetic force from the corresponding region of the magnetic levitation seat in accordance with the offset angle comprises selecting, by the magnetic levitation seat, at least one magnetic force adjustment region corresponding to the offset angle from the N pairs of magnetic force adjustment regions in accordance with a first correspondence between the offset angles and the magnetic force adjustment regions acquired in advance, and adjusting the magnetic force from the at least one magnetic force adjustment region.

4. The method according to claim 3, wherein the step of selecting, by the magnetic levitation seat, the at least one magnetic force adjustment region corresponding to the offset angle from the N pairs of magnetic force adjustment regions in accordance with the first correspondence between the offset angles and the magnetic force adjustment regions acquired in advance, and adjusting the magnetic force from the at least one magnetic force adjustment region comprises:

selecting, by the magnetic levitation seat, the at least one magnetic force adjustment region corresponding to the offset angle from the N pairs of magnetic force adjustment regions in accordance with the first correspondence between the offset angles and the magnetic force adjustment regions acquired in advance; and adjusting, by the magnetic levitation seat, the magnetic force from the at least one magnetic force adjustment region using a magnetic force adjustment parameter corresponding to the offset angle in accordance with a second correspondence between the offset angles and the magnetic force adjustment parameters acquired in advance.

5. The method according to claim 2, wherein subsequent to the step of adjusting, by the magnetic levitation seat, the magnetic force from the corresponding region of the magnetic levitation seat in accordance with the offset angle, the method further comprises receiving, by the magnetic levitation seat, balance information from the magnetic levitation object, and in the case that the balance information meets a predetermined condition, controlling the regions of the magnetic levitation seat to generate a substantially identical magnetic force.

6. The method according to claim 2, wherein an opening is provided at the central magnetic point of the magnetic levitation seat, and an infrared receiver is arranged in the opening; and prior to the step of receiving, by the magnetic levitation seat, the angular offset information from the magnetic levitation object, the method further comprises, in the case that the magnetic levitation seat has received an infrared signal from the magnetic levitated object through the infrared receiver, transmitting to the magnetic levitation object indication information indicating that the magnetic levitation object is within an adjustable state.

7. The method according to claim 1, wherein the magnetic levitation object is provided with a geomagnetic sensor, and the step of detecting, by the magnetic levitation object, the offset angle of the center of gravity of the magnetic levitation object relative to the central magnetic point of the magnetic levitation seat comprises detecting, by the magnetic levitation object, the offset angle of the center of gravity of the magnetic levitation object relative to the central magnetic point of the magnetic levitation seat through the geomagnetic sensor.

8. The method according to claim 1, wherein subsequent to the step of transmitting, by the magnetic levitation object, the angular offset information to the magnetic levitation seat, the method further comprises, in the case that the offset angle of the center of gravity of the magnetic levitation object relative to the central magnetic point of the magnetic levitation seat is within a predetermined range, transmitting balance information to the magnetic levitation seat, so as to enable the magnetic levitation seat to control the regions of the magnetic levitation seat to generate a substantially identical magnetic force.

9. The method according to claim 1, wherein an infrared transmitter is arranged at the center of gravity of the magnetic levitation object, and the magnetic levitation object is provided at the center of gravity with a transmission opening extending to a bottom of the magnetic levitation object, wherein prior to the step of detecting, by the magnetic levitation object, the offset angle of the center of gravity of the magnetic levitation objection relative to the central magnetic point of the magnetic levitation seat, the method further comprises transmitting, by the infrared transmitter, an infrared signal to the magnetic levitation seat via the transmission opening; and the step of detecting, by the magnetic levitation object, the offset angle of the center of gravity of the magnetic levitation object relative to the central magnetic force of the magnetic levitation seat comprises, in the case that the magnetic levitation object has received from the magnetic levitation seat indication information indicating that the magnetic levitation object is in an adjustable state, detecting the offset angle of the center of gravity of the magnetic levitation object relative to the central magnetic point of the magnetic levitation seat.

* * * * *